(12) United States Patent
Huber

(10) Patent No.: US 8,037,470 B2
(45) Date of Patent: *Oct. 11, 2011

(54) MANUFACTURING SYSTEM SOFTWARE VERSION MANAGEMENT

(75) Inventor: Robert Huber, Summerhill (SG)

(73) Assignee: ASM Assembly Systems GmbH & Co. KG, Munich (DE)

( * ) Notice: Subject to any disclaimer, the term of this patent is extended or adjusted under 35 U.S.C. 154(b) by 992 days.

This patent is subject to a terminal disclaimer.

(21) Appl. No.: 11/860,145

(22) Filed: Sep. 24, 2007

(65) Prior Publication Data

US 2008/0295089 A1   Nov. 27, 2008

Related U.S. Application Data

(63) Continuation of application No. 09/970,619, filed on Oct. 4, 2001, now Pat. No. 7,275,245.

(60) Provisional application No. 60/237,910, filed on Oct. 4, 2000.

(51) Int. Cl.
*G06F 9/44* (2006.01)
*G06F 9/445* (2006.01)

(52) U.S. Cl. ........ 717/170; 717/120; 717/122; 717/168; 717/173; 717/175; 717/178

(58) Field of Classification Search .................. None
See application file for complete search history.

(56) References Cited

U.S. PATENT DOCUMENTS

| | | | | |
|---|---|---|---|---|
| 4,912,637 A * | 3/1990 | Sheedy et al. | ............. | 1/1 |
| 5,191,534 A * | 3/1993 | Orr et al. | ............. | 700/105 |
| 5,278,979 A * | 1/1994 | Foster et al. | ............. | 1/1 |
| 5,317,729 A * | 5/1994 | Mukherjee et al. | ............. | 1/1 |
| 5,375,237 A * | 12/1994 | Tanaka et al. | ............. | 1/1 |
| 5,602,993 A * | 2/1997 | Stromberg | ............. | 717/173 |
| 5,729,744 A * | 3/1998 | Gerken et al. | ............. | 1/1 |
| 5,806,078 A * | 9/1998 | Hug et al. | ............. | 715/205 |
| 5,991,774 A * | 11/1999 | Tate et al. | ............. | 1/1 |
| 6,094,654 A * | 7/2000 | Van Huben et al. | ............. | 1/1 |
| 6,128,626 A * | 10/2000 | Beauchesne | ............. | 1/1 |
| 6,151,700 A * | 11/2000 | Fox | ............. | 717/107 |
| 6,182,245 B1 * | 1/2001 | Akin et al. | ............. | 714/38 |
| 6,199,204 B1 * | 3/2001 | Donohue | ............. | 717/178 |
| 6,223,343 B1 * | 4/2001 | Hopwood et al. | ............. | 717/101 |
| 6,256,773 B1 * | 7/2001 | Bowman-Amuah | ............. | 717/121 |
| 6,411,990 B1 * | 6/2002 | Shaffer et al. | ............. | 709/206 |
| 6,615,166 B1 * | 9/2003 | Guheen et al. | ............. | 703/27 |
| 6,715,069 B1 * | 3/2004 | Lucky | ............. | 713/1 |
| 6,789,252 B1 * | 9/2004 | Burke et al. | ............. | 717/100 |

(Continued)

OTHER PUBLICATIONS

Thomas, "Version and Configuration Management on a Software Engineering Database," ACM, vol. 14 Issue 7, 1989.*

*Primary Examiner* — Insun Kang
(74) *Attorney, Agent, or Firm* — Harness, Dickey & Pierce, P.L.C.

(57) ABSTRACT

Version management for manufacturing system software involves a two-part data structure, having two identifiers that are separately and automatically modified, depending upon the changes or modifications that are made, respectively, to top-level and lower-level subsets of manufacturing system programs. According to various other aspects of the present invention, methods for managing revisions involve automatically assigning a version designator under preselected conditions, automatically notifying personnel having a need to know of the change, and managing revisions by way of a revision compare function.

9 Claims, 7 Drawing Sheets

U.S. PATENT DOCUMENTS

| | | | |
|---|---|---|---|
| 2001/0044738 A1* | 11/2001 | Elkin et al. | 705/8 |
| 2002/0019730 A1* | 2/2002 | Garner et al. | 703/14 |
| 2002/0019827 A1* | 2/2002 | Shiman et al. | 707/200 |
| 2003/0167307 A1* | 9/2003 | Filepp et al. | 709/205 |
| 2003/0208467 A1* | 11/2003 | Kahn et al. | 707/1 |
| 2004/0031030 A1* | 2/2004 | Kidder et al. | 717/172 |
| 2004/0078727 A1* | 4/2004 | Little et al. | 714/48 |
| 2004/0107125 A1* | 6/2004 | Guheen et al. | 705/7 |
| 2004/0153718 A1* | 8/2004 | Shen et al. | 714/5 |

* cited by examiner

VERSION TRACKING ON A SINGLE LINE

| Event | User | Action | Object | Name | Version |
|---|---|---|---|---|---|
| 1 | Eng/Op | Programs a board | Recipe -1 | Board | V1.00 |
| 2 | Eng/Op | Modifies the same board | " | " | " |
| 3 | Eng/Op | Downloads Recipe-2 for Smartphone line | Recipe -1<br>Recipe -2 | Board<br>SPLine | "<br>" |
| 4 | LINE... | Runs board & requests validation | " | " | " |
| 5 | Eng/Op | Checks board & finds error | Recipe -1 | Board | |
| 6 | Eng/Op | Corrects program | " | " | " |
| 7 | Eng/Op | Downloads recipe | Recipe -1<br>Recipe -2 | Board<br>SPLine | "<br>" |
| 8 | LINE... | Runs board & requests validation | " | " | " |
| 9 | Eng/Op | Checks board and Releases it | Recipe -1<br>Recipe -2 | Board<br>SPLine | V1.00R<br>V1.00R |
| 10 | At a later time, Eng/Op wants to modify sub-object SOT23 | | Package Form | SOT 23 | V1.00R |
| 11 | Eng/Op | Modifies SOT23 | Pkg. Form<br>Recipe-1<br>Recipe-2 | SOT 23<br>Board<br>SPLine | V2.00<br>V1.01<br>V1.01 |
| 12 | Eng/Op | Downloads Recipe-2 and runs board | Pkg. Form<br>Recipe-1<br>Recipe-2 | SOT 23<br>Board<br>SPLine | V2.00<br>V1.01<br>V1.01 |
| 13 | LINE... | Runs board & requests release of Recipe-1/2 (line/board) | " | " | " |
| 14 | Eng/Op | Checks pkg.& validates it, which is equivalent to releasing it for a single line. | Pkg. Form<br>Recipe-1<br>Recipe-2 | SOT 23<br>Board<br>SPLine | V2.00R<br>V1.01R<br>V1.01R |
| 15 | At a later time, Eng/Op downloads program | | Pkg. Form<br>Recipe-1<br>Recipe-2 | SOT 23<br>Board<br>SPLine | V2.00R<br>V1.01R<br>V1.01R |
| 16 | LINE... | Runs board with no modifications | " | " | " |
| 17 | At a later time, Eng/Op downloads a different recipe (3) with the same SOT 23 as modified earlier in V1.01. | | Recipe-3 | Pocket PC | V1.00R |
| 18 | Eng/Op | finds problem and differently modifies SOT23 again | Recipe-3<br>Pkg.Form2 | Pck.PC<br>SOT 23 | V1.01<br>V3.0 |
| 19 | Eng/Op | downloads program to line | " | " | " |
| 20 | LINE... | Runs board & requests release | " | " | " |
| 21 | Eng/Op | Checks board and Releases it | Recipe-3<br>Pkg.Form2 | Pck.PC<br>SOT 23 | V1.01R<br>V3.0R |
| 22 | SYSTEM | Automatically updates recipes at the Enterprise level | Pkg. Form<br>Recipe-1<br>Recipe-3 | SOT 23<br>Board<br>Pck.PC | V3.00R<br>V1.02R<br>V1.02R |

*Fig. 3*

VERSION TRACKING IN A MULTIPLE-LINE FACTORY

| Step | User | Action | Object | Name | Version |
|---|---|---|---|---|---|
| 23 | Engineer | Programs a board | Recipe -1 | Board | V1.00 |
| 24 | Engineer | Modifies the same board | " | " | " |
| 25 | Engineer | Downloads Recipe-2 for Smartphone line | Recipe -1<br>Recipe -2 | Board<br>SPLine | "<br>" |
| 26 | LINE......... | Runs board & asks Operator to validate recipe/board | " | " | " |
| 27 | Operator | Checks board & finds error | Recipe -1 | Board | |
| 28 | Operator | Corrects program | " | " | " |
| 29 | Operator | Downloads recipe & runs board | Recipe -1<br>Recipe -2 | Board<br>SPLine | "<br>" |
| 30 | LINE......... | Runs board & asks Operator to validate recipe/board | " | " | " |
| 31 | Operator | Checks board and validates it | Recipe -1<br>Recipe -2 | Board<br>SPLine | V1.00V<br>V1.00V |
| 32 | At a later time, Operator finds some issues on SOT23 | | Package Form | SOT 23 | V1.00R |
| 33 | Operator | Modifies SOT23 | Pkg. Form<br>Recipe-1<br>Recipe-2 | SOT 23<br>Board<br>SPLine | V2.00<br>V1.01<br>V1.01 |
| 34 | Operator | Downloads recipe for Smartphone Line | Pkg. Form<br>Recipe-1<br>Recipe-2 | SOT 23<br>Board<br>SPLine | V2.00<br>V1.01<br>V1.01 |
| 35 | LINE......... | Runs board & requests release | " | " | " |
| 36 | Operator | Checks board and Validates it | Pkg. Form<br>Recipe-1<br>Recipe-2 | SOT 23<br>Board<br>SPLine | V2.00V<br>V1.01V<br>V1.01V |
| 37 | Engineer informed of modification | | | | |
| 38 | Engineer | approves modification & Releases SOT 23 | Package Form | SOT 23 | V2.00R |
| 39 | Operator | Downloads to different line Released objects are also released on a different line, validated objects have to be validated again | Pkg. Form<br>Recipe-1<br>Recipe-2 | SOT 23<br>Board<br>SPLine | V2.00R<br>V1.01<br>V1.01 |
| 40 | LINE 2 | Runs board and asks operator to validate recipe/board | | | |
| 41 | Operator | checks program and validates it | Pkg. Form<br>Recipe-1<br>Recipe-2 | SOT 23<br>Board<br>SPLine | V2.00R<br>V1.01V<br>V1.01V |
| 42 | Engineer | checks program and releases it | Pkg. Form<br>Recipe-1<br>Recipe-2 | SOT 23<br>Board<br>SPLine | V2.00R<br>V1.01R<br>V1.01R |
| 43 | Operator | Downloads program to a third line | Pkg. Form<br>Recipe-1<br>Recipe-2 | SOT 23<br>Board<br>SPLine | V2.00R<br>V1.01R<br>V1.01R |
| 44 | Line 3 | Runs board since it is a released program | | | |

*Fig. 4*

MANUFACTURING SYSTEM SOFTWARE VERSION MANAGEMENT

This application is a continuation of U.S. application Ser. No. 09/970,619, filed on Oct. 4, 2001, now U.S. Pat. No. 7,275,245 and claims the benefit under 35 U.S.C ¶ 119(e) of the priority date of U.S. Provisional Patent Application No. 60/237,910, filed Oct. 4, 2000, the contents of which are herein incorporated by reference in their entirety.

FIELD OF THE INVENTION

The present invention relates generally to the field of manufacturing control systems and, in particular, to a system and method for managing versions of computer programs for manufacturing control systems.

BACKGROUND OF THE INVENTION

In manufacturing systems, such as those for electronics assembly, articles of manufacture and processes associated with their manufacture are represented by computer programs. In the manufacture of electronics assemblies, many changes may occur in the design of the assemblies and in the programs that represent them. A product will generally comprise components that may, themselves, be changed. Furthermore, a second product may be developed that may differ from the first product only in certain respects. Changes to computer programs, whether they arise from product changes or from software reruns must be carefully managed to avoid running manufacturing lines with incorrect instructions and thereby wasting machine time as well as materials. It is therefore critical to be able to assign appropriate versions to each program to track the various versions, and to validate or release only those versions of a program that have been duly authorized.

The problem of managing various authorized versions of a program becomes even more daunting when a product, or derivatives of the product, are manufactured not only on one line, under the supervision of a responsible engineer, but in multiple lines in one factory, or in multiple lines in several factories that are geographically distributed. The creation of versions of computer programs in this context, not to mention the validation and release of such versions, presents an enormous challenge.

There is, therefore, a need for a practicable, disciplined approach to the creation and management of versions of computer programs representing articles of manufacture, as well as for their validation and release.

SUMMARY OF THE INVENTION

The present invention addresses the need, set forth above, for an approach directed to managing revisions to versions of programs that control the manufacture of articles in a computer-operated manufacturing system. Application of the systems and methods according to present invention can eliminate wasted time and parts that may be encountered in manufacturing assembly lines. The problems can arise from inconsistent understandings as to the latest status of the program that is to be run for assembling parts. These, in turn, may be due to a lack of proper means for tracking the latest version of the program for controlling the running of the manufacturing line. Even if the method or means used for tracking a single digit version number, such as exemplified by designator "V1", for, say, an electronic board (e.g., circuit board, printed circuit board as they may be referred to later), is satisfactory for tracking one type of program, it may not be adequate for tracking changes to the program. In accordance with an aspect of the present invention, version numbers are designated in such a way that any changes made to the same program are reflected in that version. This is accomplished by providing an additional field, for example for decimal places, in the version number (e.g., V1.00), which can be used to reflect the changes that are made in the sub-parts or sub-objects of the main part of the program, in addition to the changes made to the main object itself. Various aspects of the invention will be described with respect to an illustrative embodiment, in which a printed circuit board with electronic components is represented by an object oriented computer program. The aspects of the invention, however, can also apply to other articles of manufacture as well as to other forms of computer representation that are hierarchical in nature.

Changes may be made to a main object of a computer program representing an article of manufacture, or to one or more sub-objects of the program. A version management system according to the present invention may also differentiate among differing sub-objects. The present invention provides a method of reflecting a change in a particular sub-object, for example, an object containing instructions for set-up associated with a product. This is accomplished by identifying each program recipe or instruction set by its unique name so that, as the sub-recipes under the main recipe change, those changes are reflected in a portion of the version designator or other status identifier.

However, every change that is made during development of a program, or during debugging of the program or of the manufacturing line itself, is preferably not reflected in the version designator, for, otherwise, it would be difficult to manage the myriad changes that could take place. Moreover, it may be unnecessary to track changes that do not have any impact on a respective product until those changes are found to be correct and used on a manufacturing line. Validation and release are also characterized with respect to the type of factory in which the manufacturing line is run.

Thus, in a one-line factory, the engineer who programs an assembly machine to manufacture a product may also be the person who sets up and runs the line. The engineer/operator therefore is knowledgeable about any changes, and can create, validate and release versions of a program corresponding to those changes as he/she sees fit.

In the case of a factory with several manufacturing lines, or of a geographically distributed manufacturing operation, or of an enterprise with several factories, the engineer who creates a program representing a product may differ from whoever is running the lines and setting them up. In this setting, a question arises as to who has responsibility for issuing the correct version of the program for running the lines, how is the correct version to be issued, and who has the permission to run the line. The present invention provides a release process to help ensure that only the latest working and valid program is released. Even if a slight change were made to the program, the user (such as a process engineer) would be notified that a modification has been made that needs to be approved. In an embodiment of this aspect of the invention, permission to release a particular version of a program depends upon the category of the line: permission for a line release can be given to all personnel (operators, process engineers, managers); for a factory release, to process engineers; and for an enterprise release, to a specific process engineer in the enterprise headquarters. The process disclosed in the instant invention also clarifies the user accountability depending upon where and how the version is released.

In a first embodiment of the present invention, a method for managing revisions to versions of a program code for manufacturing systems is disclosed wherein a particular program version is downloaded and run on the manufacturing system, and, if the program performs according to a preselected criterion, a revised status identifier is designated.

Another aspect of the present invention is directed to a computer data structure for use in identifying programs for computer-controlled manufacturing systems. In an embodiment of this aspect of the invention, the programs comprise subsets organized with respect to one another in a hierarchical fashion, the subsets comprising a top-level subset and a plurality of lower-level subsets related hierarchically to the top-level subsets and to each other. A first portion indicates a revision to the top-level subset of the program, and a second portion indicates a revision to any of the lower-level subsets of the program. A method for completing the data structure is disclosed where, in a first portion for indicating a revision to the top-level subset of a program, a first symbol is inserted to indicate that such a revision has been made, and similarly, in a second portion for indicating a revision to the top-level subset of the program, a second symbol is inserted to indicate that such a revision has been made.

In another aspect of the present invention, a computer-implemented method for managing revision to a program used in the control of a manufacturing system is taught. The method involves identifying that a revision has been made to the program; identifying whether the program, as revised, satisfies a preselected criterion; if the program, as revised, satisfies the preselected criterion, automatically selecting a version designator according to a preselected scheme; and automatically associating the selected version designator with the program code.

In addition, methods for managing revisions to a program used in the control of manufacturing system supervised by at least one operator, and in the control of plurality of manufacturing lines, are disclosed. In the former method, the manufacturing system is in communication over a network with a server coupled to a database containing the program, the manufacturing system and the server also in communication over the network with at least one client device, the at least one client device permitting communication with the server by a person authorized to do so in order to access the program, the program also being accessible via the server by the at least one operator through an interface associated with the manufacturing system. The occurrence of a revision to the program is detected over the network, and a determination is made as to whether the revision to the program was made by a particular one of the at least one authorized person. If the revision was not made by a particular one of the at least one authorized person, a message is sent over the network from the server to a client device to notify the particular person that the revision was made.

In the latter method, a version of a program is downloaded to the manufacturing system for testing the program associated with a status identifier, where the program relates to an article of manufacture that may be represented graphically based on information in the program. Then a request is received to compare a first version of the program associated with a first status identifier with a second version of the program associated with a second status identifier, the first and second status identifiers assigned upon release of the respective versions for use on the plurality of manufacturing lines. Next, the program versions associated with the first and second status identifiers are retrieved, the program versions are compared to identify a set of differences, and the differences are displayed having a visual characteristic that contrasts with the representation of the article graphically.

Accordingly, the present invention provides a computer-implemented method for managing revisions to a program used in the control of manufacturing systems. This is accomplished by providing a two-part data structure for revision/version management; a method for completing a two-part data structure; a method for managing revisions involving automatically assigning a version identifier under preselected conditions; a method for managing revision involving automatic notification of personnel with a need to know of the change; and a method for managing revision involving a revision compare function. An object of the present invention is to reduce wasted time and parts, and hence improve productivity on the manufacturing line. Other objects and advantages will be apparent to those skilled in the art in view of the following description.

BRIEF DESCRIPTION OF THE DRAWINGS

FIG. 1a shows a symbolic representation of an embodiment of a data structure representing a version designator, according to the present invention.

FIG. 1b shows an embodiment of a version designator according to the present invention, showing a two level representation of revision numbers for a main object and a sub-object.

FIG. 3 is a chart showing an embodiment of a version tracking approach, according to the present invention, on a single manufacturing line.

FIG. 4 is a chart showing an embodiment of a version tracking approach, according to the present invention, on a multiple-line factory.

DETAILED DESCRIPTION

FIG. 1a shows a data structure designator that is used for identifying the version, and the status of that version, of a program comprising a main object and sub-objects that together represent an article of manufacture, as well as a manufacturing process step associated with that article. The first character, which in the illustrated embodiment is shown as a generic "X" (01), is a version label and can be a V, the first letter of the word "version." A top-level version identifier (02), after the version label, indicates the number of times the main object was changed, i.e., the revision number of the main object, while a lower-level version identifier after the decimal point represents the revision number of the sub-object(s). Generic letter "Y" after the numbers indicates the status of that particular version. Thus, using as an example a printed circuit board that is processed in an electronic components manufacturing line, the symbol in FIG. 1b represents a second version of the board with a third revision of a sub-object component on that board, and that V2.03R is the released version where "R" stands for "released". Had it been a validated version, which will be described in greater detail below, the symbol would have been indicated as V2.03V. It will be understood by those skilled in the art that, in general, such a symbol as in FIGS. 1a and 1b can represent the status and the revision of any main portion (e.g., object), and sub-portions (e.g., sub-objects) of a program. Also, in this embodiment of the versioning method (although not in general), the version number has at least two increasing numbers straddling a decimal point that separates them. The first number, on the left of the decimal point, represents the revision number of the main object, while the second number represents the revision number of the modification of any of the sub-objects that are associated with the main object.

Figure 2A:
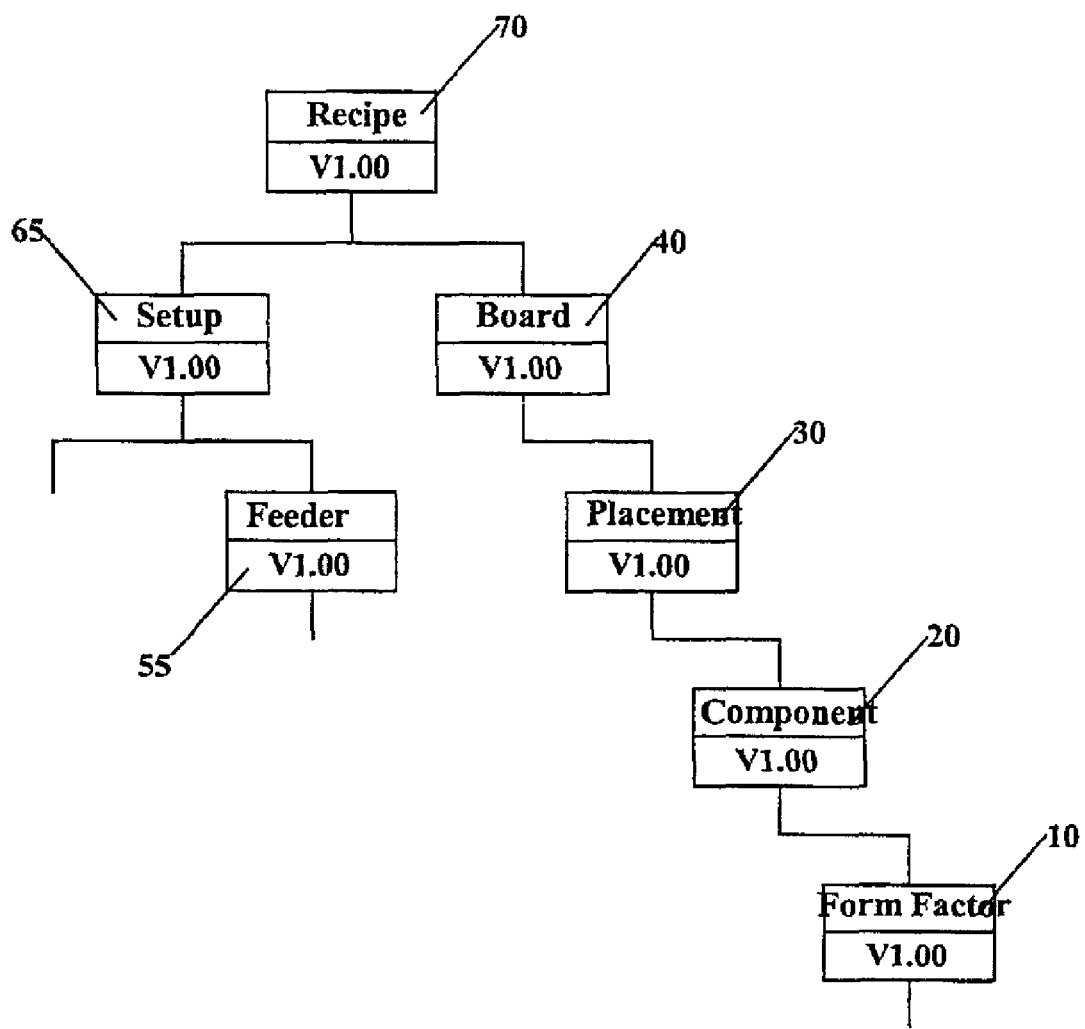
FIG. 2a shows an example of the creation of objects and sub-objects, according to the present invention in the context of a build process flow for a representative mobile phone.

Assignment of version numbers to objects, such as boards, starts with initial programming. Thus, FIG. 2a is a schematic drawing showing is the initial steps of programming a computer-operated system for the assembly of a board for a mobile telephone. The board may be a multi-layered board with the required wiring layers, and provided with sites on it where other components, such as, resistors, capacitors, transistors, integrated chips and small outline transistors (SOTs), and so forth, are to be joined to the surface of the board using technologies such as solder ball joining, wire bonding and other technologies known in the art. It will also be understood that these various components are fed into placement machines through respective feeders. Furthermore, the system is to be programmed for one specific manufacturing line. Thus, the computer-controlled system is to be programmed to place certain components on a particular board, in this case a mobile phone board, and through the use of a machine setup for the particular assembly line. It is evident, therefore, that the final assembled board can have different characteristics or features based not only on the type of components that are placed on it, but also on the particular machine setup that is used on the line. In other words, the over-all instructions, or recipe, to be programmed into the computer-controlled system must include a sub-recipe having a list of components, a placement list for those components and, at the same time, another sub-recipe describing the setup characteristics of the line, including the feeder characteristics, as an example for the case shown in FIG. 2a.

When programming a manufacturing line anew with a new object, it is important to note that that new object is automatically assigned the version V1.00, regardless of the versions of the sub-objects, which will be described at greater length below in the description of the embodiments. Thus, in building the mobile phone process flow shown in FIG. 2a, first the sub-objects are created in the program: namely, package form (10), i.e., the geometry of the area, including spacing, into which the transistor components will be placed; components (20) themselves; placement list (30), i.e., the places where the components will be mounted on the board; board (40). Each sub-object has a version V1.00. Similarly, the sub-objects on the mobile phone sub-recipe side of the main-recipe also are assigned version V1.00: namely, feeder (55) for feeding components in placement on the board, and setup for the mobile phone line. Finally, the main-object, that is, main-recipe (70) for all the instructions in the sub-recipes also gets version V1.00. Even if the sub-objects are of a different version, the main object still gets version V1.00. At this point, the version is not yet released for manufacturing.

However, once the main recipe (70) is first created with version V1.00, any subsequent changes and modifications in the sub-objects will be reflected in the revision number for all the sub-objects upstream from that changed sub-object, up to and including the main-recipe. Thus, if a mobile phone board built with recipe V1.00 having component (20) with a package form factor (10) is defective because of an inadequate tolerance prescribed in that form factor, a different form factor can be assigned, thereby changing the version for the package form to V2.00. Any sub-object that does not comprise, and, therefore is not influenced by other sub-sub-objects, as in the case with the package form factor, will have its second set of numbers of its version number unchanged at 0.00. However, as pointed out above, any sub-object that is influenced by changes in other sub-objects, will have their version numbers incremented by 0.01. Hence the version numbers V1.01 shown in FIG. 2b.

Figure 2B:
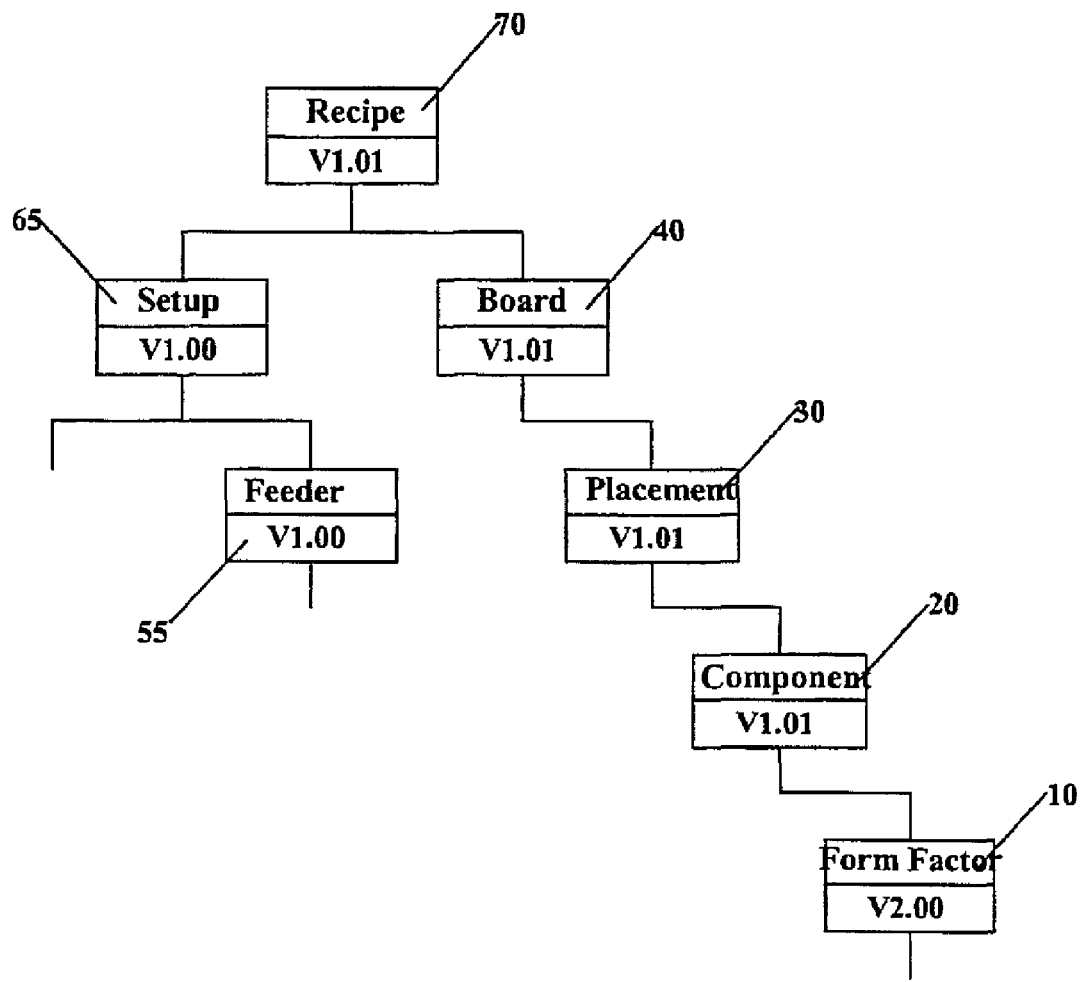
FIG. 2b shows a process flow for building a mobile phone and an embodiment of a versioning method for programs having objects and sub-objects, according to the present invention.
Figure 2C:
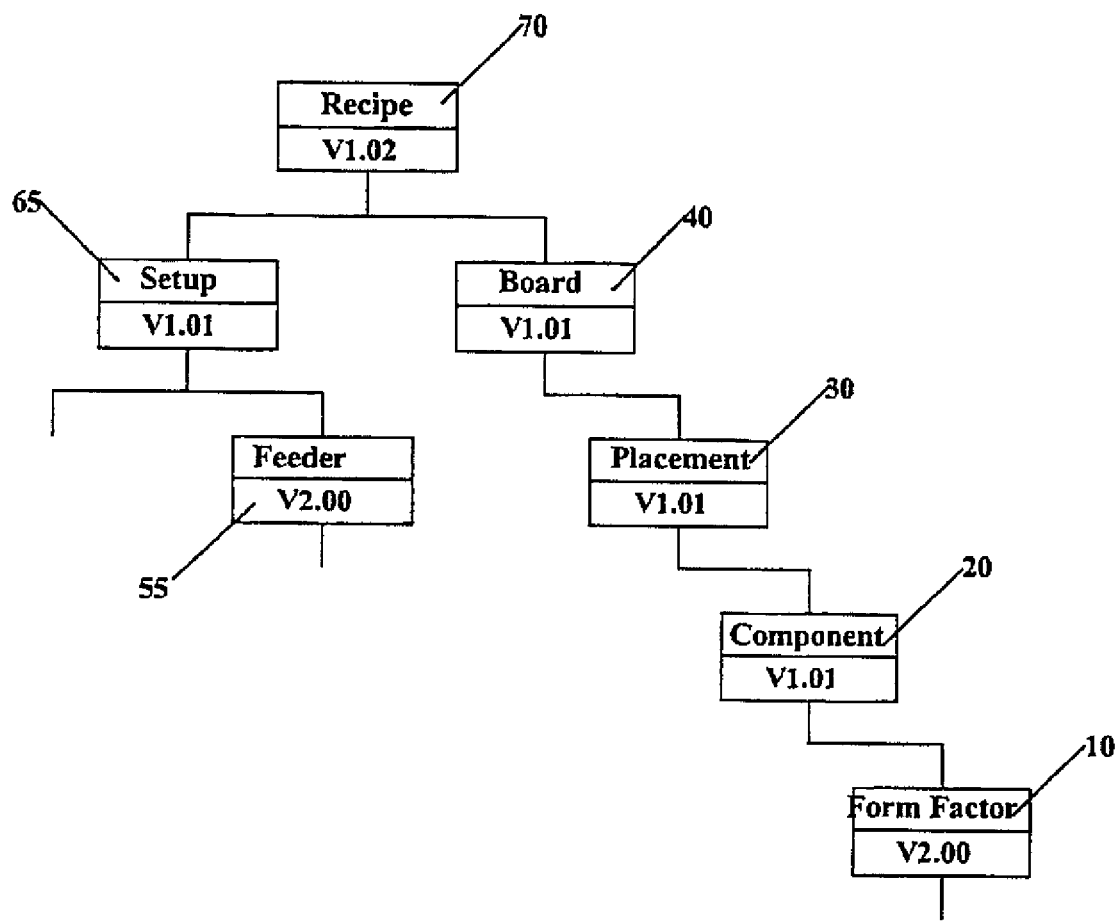
FIG. 2c shows a process flow for building a mobile phone, along with the effect of changes in sub-recipes on an embodiment of a version designator of a main recipe, according to the present invention.

Any change on the right hand side leg of FIG. 2b, that is, in the collective sub-recipe of the right hand side (80) of the same Figure, which can be characterized as board recipe, does also affect the sub-recipe on the left side (90), which also can be characterized as setup or line recipe. Because the package form is now of version V2.00, the feeder incorporating that package form takes on version V1.01, and so does the setup sub-object. If, now, the feeder is modified for some reason, and becomes version 2.00, for example, that will affect the setup sub-object recipe, and the main recipe or object (70) will also have its version incremented by 0.01 to V1.02. This is shown in FIG. 2c. Thus, the main object, which is upstream of the setup recipe, shows two changes in its sub-objects. Sub-recipes from which those changes emanate should preferably be given unique names, such as "Setup" or "Line" recipe on the left side of FIG. 2b, and "Board" recipe for the right side in the same Figure so that the user can trace back where the change or modifications took place.

After the initial programming of a computer-controlled manufacturing system, any subsequent modification, that is, editing of the objects, takes on a different significance depending upon whether the edited version is released or not. First, when a version 1.00 is downloaded to the line, the machines on the line will allow only one board to run through the line, but in the "run-in" mode only. A second board is allowed to move into the input conveyor of a machine, but requires the user to press the start button before it can be assembled. The user will be asked to check the entire board and confirm if the board got assembled without any errors. To help in checking the modifications, graphical printout as well as textual printout of the modified parameters will be displayed at the station or can be printed to help in finding the modification to an earlier released version. As soon as the user approves the program, the version is then either released or validated, depending upon the permission level, as will be described further below, and will receive an "R" or "V", respectively, at the end of the version, which is then frozen. The line will no longer require the manual intervention for the start button to be pressed for each board to go through the line thereafter. Thus, when the last released version is being edited, the version automatically increases by 1 and sets the last digits to 0.00. Similarly, when an earlier released version is being edited, the first digit of the version will be increased by 1 and the last two digits set to 0.00. When an unreleased version is being edited, the version number does not increase.

When a sub-object (released or unreleased) of an unreleased version is being edited, the version of the main object does not increase. On the other hand, when a sub-object of a released version is being edited, the version increases by 0.01 and will be marked as unreleased. When the same sub-object then is released, even as part of a different recipe, the main object will automatically be released for the areas the sub-object was released.

It will be appreciated by those skilled in the art that it is most important to have the latest valid and working program running in the manufacturing line. If a slight change is made to a working program, the user is, according to the present invention, automatically notified and informed of what modification to check and approve. Depending upon the level of the "permission" or approval authority that the user has, the user may be allowed to validate the product for a line, or release the product for the factory or globally.

Validation and release processes are distinguished by the level of permission granted to the user for validation and release. Released objects (such as recipes) are valid for an entire factory having multiple lines, or even a plurality of factories, whereas validated objects are valid for only one line. Release can only be given to objects by authorized users with high levels of permission. In contrast, validation can be done by personnel with lower levels of permission, such as operators, to allow them to modify programs that cause a problem and then continue the running of the line. However, any change the operators make is valid only for that line, and it requires the approval of an expert (such as an authorized process engineer) for the change to be disseminated to the rest of the factory. Likewise, before the validated objects can be downloaded to other lines, they must first be selected by someone with the appropriate permission level. Released versions are, in general, the version that will be downloaded. Just as the release of a higher level object will release lower level objects automatically, the validation of higher level objects will validate lower level objects automatically.

According to another aspect of the present invention the process of releasing a version provides for the most flexibility in not curtailing the productivity of the line. That is, any user can release objects commensurate with his or her level of responsibility and accountability. In one embodiment, on every machine on which an unreleased version is run, after each product (e.g., circuit board is run under the unreleased version), a release dialog appears, asking to release the data. For example, the question may be "Would you like to release recipe Telephone_386?" The pop-up dialog window has three buttons respectively labeled "Yes", "No" and "Details." Under Details, information can be displayed as to exactly what is to be released. Preferably, there is the additional feature under the Details button to be able to select and release parts of the recipe, rather than the whole recipe for which a higher level of permission would be required. Thus, any personnel, commensurate with their level of responsibility, can release objects with or without user accountability.

Releasing objects with user accountability, however, requires that information regarding what object is released by whom is to be recorded. This is especially important on lines where more than one operator works, in order to know who released a particular object. In this case, after pressing the "Yes" button on the Release Dialog, another pop up dialog is presented where the user name and password are to be entered. Only if the password matches with the user name, and the specific user has the level of permission required, is the object, e.g., recipe, released and the user information stored with it.

Where an operator is equipped with a mobile operator kit, such as a Pocket PC® with a bar-code scanner, or other suitable handheld computer, in contrast to stationary computer stations, the operator can perform many different functions, including closed loop component validation, performance maximization, and others. The user has to log on to the manufacturing control system, before she/he can use it. Since there is one operator kit per operator, the login information can be used to check permission level in order to release objects and record the release information including the user information.

In another aspect of the present invention, the computer-controlled manufacturing system provides help to a user in deciding whether he/she wants to download the latest released version, a specific version or the latest unreleased version of an object, such as a recipe. This is accomplished by giving the user a choice in selecting a version to download, however, commensurate with her/his level of permission. With a minimum grant of permission, the user will only be able to select the latest released or validated version for that line to download. This will be the normal case for operators. Also, when selecting a recipe, the default is preferably the latest released or validated version. The availability of the newer, unreleased or partially released version is also made visible to the user. A partially released version is that which is validated for another line or released for another factory. The user then chooses to decide which version to select. It is also possible to select a previous version, if required.

An example of execution of an embodiment of the present invention, with the various events described above, is shown in FIG. 3. In the illustrated embodiment, without limitation, a one-line factory is programmed by one or more engineers. The engineer who programs the products (e.g., boards and machine instructions for assembly) is very often the same person running the line as well, or the person who prepares the set-up for the run. The engineer/operator, therefore, is knowledgeable about any changes and can make, validate and release versions of the program corresponding to those changes as he/she sees fit. Using FIGS. 2a-2c also, where now Recipe-1 refers to the Board recipe and Recipe-2 refers to the line or setup recipe, it is seen that both objects with the names of board and mobile phone line take version V1.00 as they are newly created objects, even with changes made to the board on the way to release. Then, with a modification made to the form factor of a small outline transistor (SOT) 23 at event 11 in the same FIG. 3, the version numbers for both recipes 1 and 2 are incremented by 0.01 while the version number of the component is incremented by 1. And they are released at event 14 after the line asks for release and the engineer/operator does so after confirming the validity of the change. It will be appreciated that, for a single line, validation and release processes coalesce, as there is no other line to which the package can be released. As still another example, FIG. 3 shows that, when a different recipe for a different product using the same board is downloaded as Recipe-3, thus replacing the mobile phone with a handheld computer the version number for Recipe-3 is incremented in the same manner as before by 0.01 if the form factor of a component downstream is modified. The version number of the component itself is incremented by 1, to V3.0 for the reasons given earlier. After checking the board for its integrity, the Recipe-3 and package form are released with the stated version numbers. Since there was a change on the board, the system automatically updates recipes at the single line Enterprise level.

The case of version tracking in a multiple-line factory is shown in FIG. 4. Here, at a factory with several manufacturing lines, or at a globally distributed factory, or at an Enterprise with several factories, the engineer who is programming the board and machines is normally a different person from the one who is running the line and setting them up. Thus, the engineer and the operator are two different entities in FIG. 4, and it is only the process engineer who can release a program. However, until the release, the operator can download, modify and change objects and validate them, but only for his/her own line. The Engineer is notified automatically when a change has occurred (see event 37 in FIG. 4) and only he or she has the authority to release the modified package with a new version number to the rest of the lines in the factory, or to the lines distributed globally throughout the Enterprise. The intermediate incremental change by 0.01 due to the modification of the package form factor follows the same procedure as was the case in FIG. 3.

Figure 5:
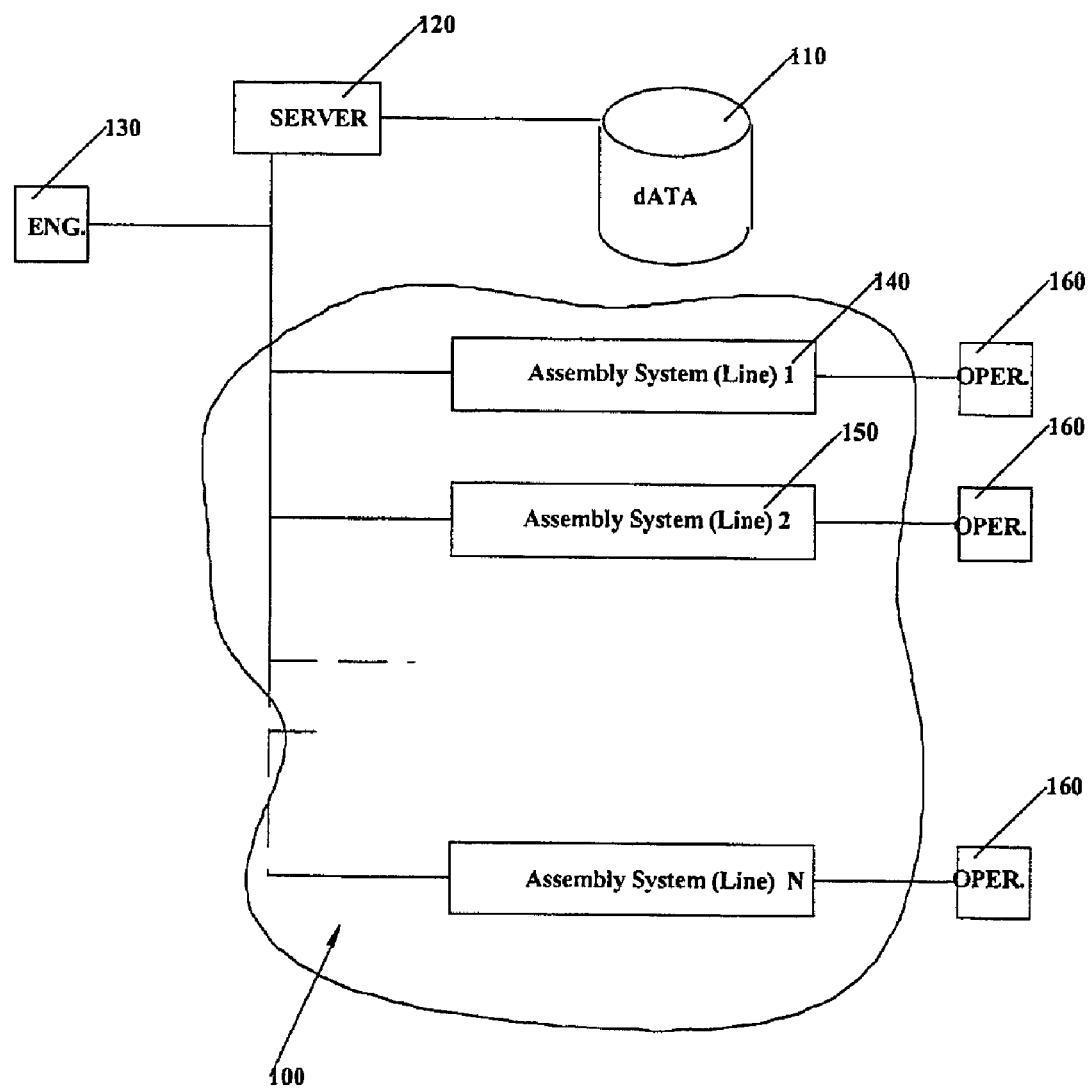
FIG. 5 is a schematic representation of a computer-controlled manufacturing system on a network communicating with a data base, a server, and a process engineer, according to the present invention.

A system shown schematically in FIG. 5 involves manufacturing system (100), comprising several lines, in communication over the network with server (120), in turn coupled to data base (110) containing the program. The manufacturing system and the server (120) are also in communication over the network with at least one client device, the at least one client device permitting communication with the server (120), by a person (130) authorized to do so in order to access the program, the program also being accessible via the server (120) by the at least one operator through an interface associated with the manufacturing system. The occurrence of a revision to the program is detected over the network, and a determination is made as to whether the revision to the program was made by a particular one of the at least one authorized person. If the revision was not made by a particular one of the at least one authorized person, a message is sent over the network from the server to a client device to notify the particular person that the revision was made.

The various aspects of the present invention have been shown and described with reference to particular embodiments and numerous details have been set forth to aid in their understanding. These specific details, however, need not necessarily be employed to practice those aspects of the invention. Moreover, changes in form and details may be made without departing from the spirit and scope of the invention. For example, the particular ordering of method steps may, in some instances, be varied or, the disclosed data structure rearranged or supplemented, while preserving its content, without departing from the scope of this aspect of the present invention.

What is claimed is:

1. In a computer-operated system for programming a manufacturing system, wherein a version of a program is downloaded to the manufacturing system and is associated with a version designator, a method for managing revisions to versions of the program, the method comprising the steps of:

running the program on the manufacturing system, the program including subsets organized with respect to one another in a hierarchical fashion, the subsets comprising a top-level subset and a plurality of lower-level subsets related hierarchically to the top-level subsets and to each other, each of the subsets identifying a main object and a sub-object, a version designator being associated with each of the subsets, each version designator including a first version identifier associated with the main object and a second version identifier associated the sub-object;

revising the first version designator identifier of a certain lower-level subset when the certain lower-level subset is modified;

if the modification of the certain lower-level subset affects other subsets, revising the second version identifier of the other affected subsets, and identifying a status of the program as one of released or validated.

2. The method according to claim 1, wherein each of the first and second version identifiers comprises a number and the step of revising the first and second version identifiers comprises the step of incrementing the version identifier.

3. The method according to claim 1, wherein the status identifier comprises a validation indicator.

4. The method according to claim 3, wherein the manufacturing system comprises at least one line, the method further including activating the validation indicator after the program runs satisfactorily on the line.

5. The method according to claim 4, wherein the validation indicator is checked as a condition to running the program on the line without manual intervention.

6. The method according to claim 1, wherein the step of identifying a status includes providing a status identifier comprises a release indicator in the form of the letter R or V.

7. The method according to claim 6, wherein the manufacturing system comprises a plurality of lines, and the release indicator identifies the program as released for use on the plurality of lines after the program runs satisfactorily on the lines.

8. The method according to claim 6, wherein the release indicator is checked as a condition to running the program on any lines of the manufacturing system without manual intervention.

9. The method according to claim 1, wherein the manufacturing system comprises an electronics assembly system.

\* \* \* \* \*